(12) United States Patent
Kim et al.

(10) Patent No.: US 12,614,544 B2
(45) Date of Patent: Apr. 28, 2026

(54) DIALOGUE SYSTEM AND CONTROL METHOD THEREOF

(71) Applicants: HYUNDAI MOTOR COMPANY, Seoul (KR); KIA CORPORATION, Seoul (KR)

(72) Inventors: Seona Kim, Seoul (KR); Cheongjae Lee, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 430 days.

(21) Appl. No.: 18/080,337

(22) Filed: Dec. 13, 2022

(65) Prior Publication Data

US 2023/0290342 A1      Sep. 14, 2023

(30) Foreign Application Priority Data

Mar. 8, 2022      (KR) ........................ 10-2022-0029555

(51) Int. Cl.
| | |
|---|---|
| *G10L 15/18* | (2013.01) |
| *G10L 15/22* | (2006.01) |
| *G10L 15/30* | (2013.01) |
| *G10L 25/63* | (2013.01) |

(52) U.S. Cl.
CPC .......... *G10L 15/1815* (2013.01); *G10L 15/22* (2013.01); *G10L 15/30* (2013.01); *G10L 25/63* (2013.01); *G10L 2015/228* (2013.01)

(58) Field of Classification Search
CPC ..... G10L 15/1815; G10L 15/22; G10L 15/30; G10L 25/63; G10L 2015/228; G10L 15/1822; G10L 13/02; G10L 15/04; G10L 15/26; G06F 40/40; G06F 40/30; G06F 3/167; H04L 51/066; H04L 51/02
See application file for complete search history.

(56) References Cited

U.S. PATENT DOCUMENTS

| | | | | |
|---|---|---|---|---|
| 11,072,344 | B2* | 7/2021 | Provost ................... | G10L 15/16 |
| 11,778,361 | B1* | 10/2023 | Lovitt ..................... | G06F 3/167 |
| | | | | 381/74 |
| 2015/0194151 | A1* | 7/2015 | Jeyachandran ......... | G10L 15/20 |
| | | | | 704/233 |
| 2017/0116982 | A1 | 4/2017 | Gelfenbeyn et al. | |
| 2019/0135304 | A1* | 5/2019 | Kim ....................... | G06F 40/35 |
| 2020/0321001 | A1 | 10/2020 | Naiki et al. | |

(Continued)

FOREIGN PATENT DOCUMENTS

| | | |
|---|---|---|
| CN | 106682090 B | 5/2020 |
| JP | 2016090681 A | 5/2016 |

(Continued)

*Primary Examiner* — Bhavesh M Mehta

(74) *Attorney, Agent, or Firm* — Morgan, Lewis & Bockius LLP

(57) ABSTRACT

A dialogue system includes a database, a voice recognition module configured to convert an utterance of a user in a vehicle into text, an intention determination module configured to identify intention of the user based on the text, an emotion determination module configured to identify the user's emotional state from the identified user's intention, and a controller configured to compare data indicating the identified intention of the user and the user's emotional state with rules stored in the database and determine whether to output a response to the user's utterance based on a result of the comparing.

24 Claims, 12 Drawing Sheets

(56)                   References Cited

U.S. PATENT DOCUMENTS

| | | | |
|---|---|---|---|
| 2021/0166683 A1* | 6/2021 | Joh | B60N 2/0027 |
| 2021/0287697 A1* | 9/2021 | Marti | G06V 20/597 |
| 2021/0358488 A1* | 11/2021 | Iyer | G06F 40/30 |
| 2022/0139390 A1* | 5/2022 | Park | G01C 21/3629 |
| | | | 704/235 |
| 2022/0198151 A1* | 6/2022 | Park | G06F 40/44 |

FOREIGN PATENT DOCUMENTS

| | | |
|---|---|---|
| KR | 10-2017-0078788 A | 7/2017 |
| KR | 10-2018-0086718 A | 8/2018 |
| KR | 10-2019-0051600 A | 5/2019 |
| KR | 10-2019-0106935 A | 9/2019 |
| KR | 10-2019-0109864 A | 9/2019 |
| KR | 10-2020-0116688 A | 10/2020 |

* cited by examiner

| UTTERANCE | UNDERSTANDING OF INTENTION | CLASSIFICATION OF EMOTION |
|---|---|---|
| WOW, I'M REALLY TIRED TODAY | Emotion.tired | TIRED (LEVEL: MEDIUM) |
| I WANT TO GO SOMEWHERE | Emotion.like_travel | NEUTRAL |
| GO AWAY | – | TIRED (LEVEL: HIGH) |
| WHAT?/SURE | – | – |
| THERE'S A LOT OF TRAFFIC TODAY | Drive.congestion | ANGRY (LEVEL: MEDIUM) |

FIG. 7
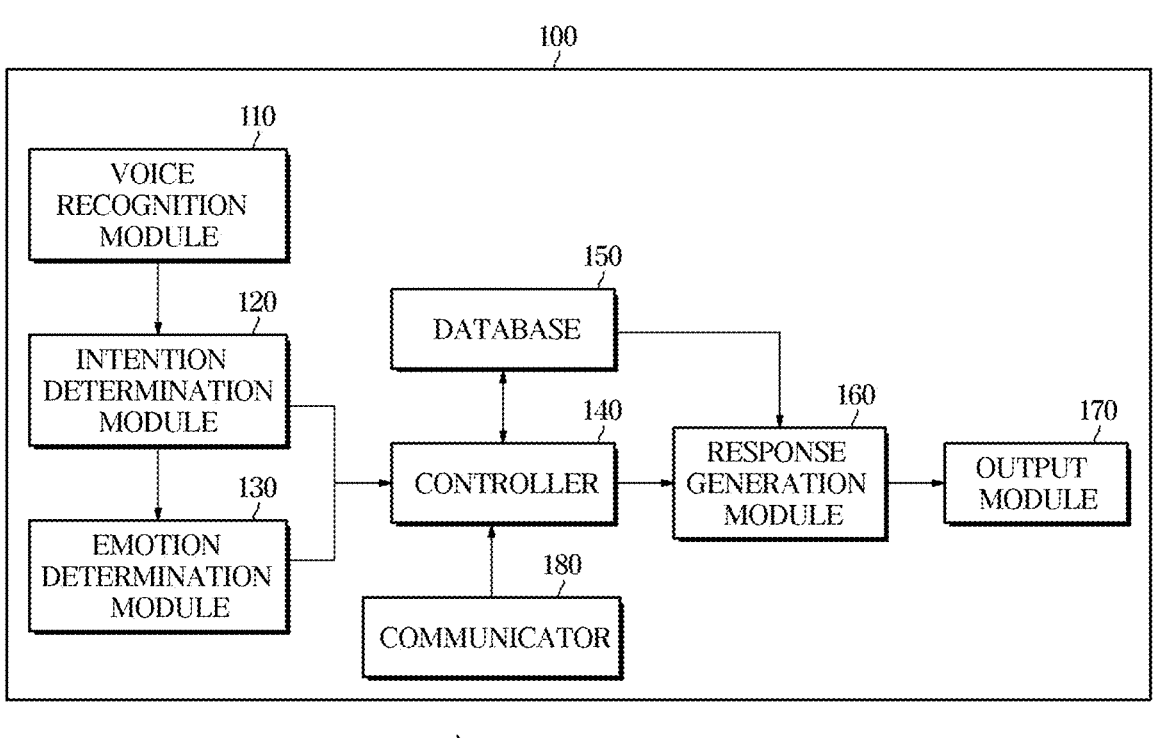
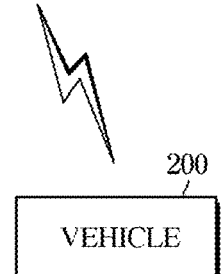

FIG. 11

| USER'S INITIAL UTTERANCE | ANALYZE UTTERANCE | EMOTION | VEHICLE STATE | RESPONSE FROM AGENT | USER'S INITIAL UTTERANCE | ANALYZE SUBSEQUENT UTTERANCE |
|---|---|---|---|---|---|---|
| WOW, I'M REALLY TIRED TODAY | Emotion .tired | TIRED (LEVEL : MEDIUM) | normal | HOW ABOUT DRIVING WHEN YOU ARE TIRED? | BE QUIET | Negative |
| SO BORING | Emotion .boring | normal | normal | DO YOU WANT TO PLAY A GAME? | OH, I LIKE IT | Positive |
| DRIVING IS BORING | drive .boring | normal | normal | DO YOU WANT TO PLAY A GAME? | GOOD | Positive |
| WHAT'S WRONG WITH THAT CAR? | User.bad _driving | upset | hard | YOU LOOK TIRED … WHAT'S WRONG WITH THAT? | GET OUT | Negative |
| SIGNAL IS TOO LONG | Emotion .boring | normal | normal | QUIZ GAME~! WHEN YOU ARE TIRED | I LIKE IT | Positive |

<RESULT OF SUBSEQUENT UTTERANCE ANALYSIS>

DIALOGUE SYSTEM AND CONTROL METHOD THEREOF

CROSS-REFERENCE TO RELATED APPLICATION

The present application claims priority to Korean Patent Application No. 10-2022-0029555, filed on Mar. 8, 2022, the entire contents of which is incorporated herein for all purposes by this reference.

BACKGROUND OF THE PRESENT DISCLOSURE

Field of the Present Disclosure

The present disclosure relates to a dialogue system configured for having a conversation with a user and a control method thereof.

Description of Related Art

A dialogue system is a system capable of identifying a user's voice to figure out the user's intention and providing a service corresponding to the user's intention.

The dialogue system may be connected to a certain device to control the device or provide certain information according to a user's intention.

Recently, such a system has been provided in vehicles so that users can control the vehicles simply by giving an utterance or obtain desired information or receive a desired service through conversations with the vehicles.

For a user to receive a desired service using such a dialogue system, the dialogue system should be capable of identifying the user's utterance, and today, dialogue agents are capable of identifying a user's subsequent utterance and figure out the user's intention when a trigger word or button is provided and the user is saying the word or pressing the button.

Such a trigger is available only when a certain word or button is used, thus causing inconvenience in use.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a dialogue system configured for identifying a user's utterance without a certain trigger, analyzing the user's intention and emotion, and providing a response to the user's intention and emotion, and a control method thereof.

It is another aspect of the present disclosure to provide a dialogue system configured for collecting feedback from a user using a database and increasing the performance of determining whether to respond to the user, allowing a natural conversation to be performed at a timing that the user desires, and a control method thereof.

Additional aspects of the present disclosure will be set forth in part in the description which follows, and in part, will be obvious from the description, or may be learned by practice of the present disclosure.

In accordance with an aspect of the present disclosure, a dialogue system includes a database, a voice recognition module configured to convert an utterance of a user in a vehicle into text, an intention determination module configured to identify the user's intention based on the text, and a controller configured to compare data indicating the identified intention of the user with rules stored in the database and determine whether to output a response to the utterance of the user based on a result of the comparing.

The dialogue system may further include an emotion determination module configured to identify an emotional state of the user from the intention of the user, and the controller may compare data indicating the identified intention of the user and the emotional state of the user with the rules stored in the database, and determine whether to output a response to the utterance of the user based on a result of the comparing.

The dialogue system may further include a response generation module configured to generate the response to the utterance of the user and an output module configured to convert the generated response into a form of voice, and when the controller determines to respond to the utterance of the user, the response generation module may generate a response to the utterance of the user, and the output module may convert the generated response into the form of voice and output the voice.

The response generation module may generate the response based on response data stored in the database.

When one user is detected by at least one sensor configured to detect a number of users, the controller may activate a microphone all the time to detect the utterance of the user.

The intention determination module may identify the user's intention based on an image captured by a camera, and the emotion determination module may identify the emotional state of the user from the intention of the user.

The dialogue system may further include a communicator configured to receive a signal related to the vehicle, and the controller may be configured to determine whether to respond to the utterance of the user based on the signal related to the vehicle received by the communicator.

The controller may store, in the database, data related to the user's intention identified by the intention determination module, data about the emotional state of the user identified by the emotion determination module, and data about the signal related to the vehicle received by the communicator.

When the controller concludes that the text obtained by conversion by the voice recognition module is related to the user's singing a song or taking on a phone, the controller may be configured to determine not to respond to the utterance of the user.

The controller may be configured to generate a control signal for driving a plurality of electronic control units (ECUs) included in the vehicle to perform a function corresponding to the utterance of the user.

The voice recognition module may convert the user's subsequent utterance to the output response into text, and the controller may store information related to the text of the subsequent utterance in the database.

The controller may store the information related to the text of the subsequent utterance in a negative category of the database when the controller concludes that the user's subsequent utterance is negative as a result of analyzing the text of the user's subsequent utterance, and store the information related to the text of the subsequent utterance in a positive category of the database when the controller concludes that the user's subsequent utterance is positive as the result of analyzing the text of the user's subsequent utterance.

In accordance with another aspect of the present disclosure, a method of controlling a dialogue system includes converting an utterance of a user in a vehicle into text, identifying the user's intention based on the text, comparing data indicating the identified intention of the user with rules stored in a database, and determining whether to output the response to the utterance of the user based on a result of the comparing.

The control method may further include identifying an emotional state of the user from the identified intention of the user, and the determining of whether to output a response to the utterance of the user may include comparing the data indicating the identified intention of the user and the emotional state of the user with the rules stored in the database, and determining whether to output the response to the utterance of the user based on a result of the comparing.

When it is determined to respond to the utterance of the user, a response to the utterance of the user may be generated, the generated response may be converted into the form of voice, and the voice may be output.

The generating of the response to the utterance of the user may include generating the response based on response data stored in the database.

When one user is detected by at least one sensor configured to detect a number of users, a microphone may be activated all the time to detect the utterance of the user.

The identifying of the user's intention may include identifying the user's intention based on an image captured by a camera, and the identifying of the emotional state of the user may include identifying the emotional state of the user from the identified intention of the user.

The control method may further include receiving a signal related to the vehicle, and the determining of whether to respond to the utterance of the user may include determining whether to respond to the utterance of the user based on the received signal related to the vehicle.

The control method may further include storing, in the database, data related to the intention of the user, data related to the identified emotional state, and data of the received signal related to the vehicle.

The determining of whether to output a response to the utterance of the user may include determining not to respond to the utterance of the user when the controller concludes that the text is related to the user's singing a song or talking on a phone.

The control method may further include generating a control signal for driving a plurality of electronic control units (ECUs) included in the vehicle to perform a function corresponding to the utterance of the user.

The control method may further include converting the user's subsequent utterance to the output response into text, and storing information related to the text of the subsequent utterance in the database.

The control method may further include analyzing the text of the user's subsequent utterance, storing the information related to the text of the subsequent utterance in a negative category in the database when the controller concludes that the analyzed text of the user's subsequent utterance is negative, and storing the information related to the text of the subsequent utterance in a positive category in the database when the controller concludes that the analyzed text of the user's subsequent utterance is positive.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 7 is a control block diagram of a dialogue system and a vehicle according to an exemplary embodiment of the present disclosure;

FIG. 11 is a diagram illustrating the analysis of a user's subsequent utterance in a dialogue system according to an exemplary embodiment of the present disclosure.

Figures 1, 2:
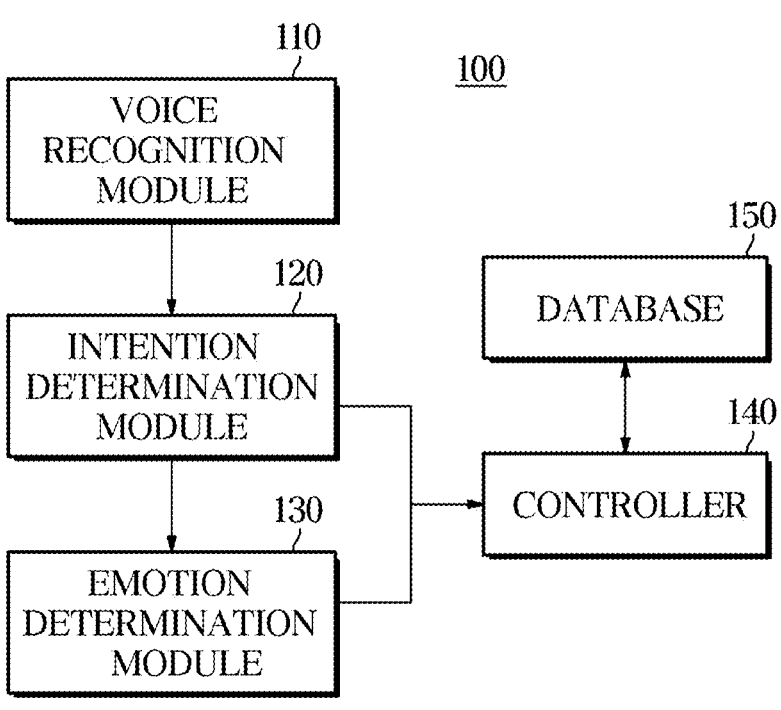
FIG. 1 is a control block diagram of a dialogue system according to an exemplary embodiment of the present disclosure.
FIG. 2 is a diagram illustrating the detection of a user's utterance and analysis of the user's intention and emotion by a dialogue system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The same reference numerals refer to the same elements throughout the specification. The present specification does not describe all elements of embodiments, and a description of general content in the field of the present disclosure to which the present disclosure pertains or the overlapping content between the exemplary embodiments will be omitted herein. Terms such as "unit," "module," "member," and "block" used herein may be embodied as software or hardware components, and according to an exemplary embodiment of the present disclosure, a plurality of units, modules, members, or blocks may be embodied together as one component or one unit, module, member or block may include a plurality of components.

Throughout the specification, when an element is referred to as being "connected to" another element, the element should be understood as being directly connected or indirectly to the other element or the indirect connection should be understood to include connection through a wireless communication network.

It will be understood that when an element is referred to as "including" another element, the element may further include other elements unless mentioned otherwise.

Throughout the present specification, when an element is referred to as being "on" another element, it should be understood that the element is in contact with the other element or another element is present therebetween.

Terms such as first and second are used to distinguish one component from another component and components are not limited by these terms.

As used herein, the singular expressions are intended to include plural forms as well, unless the context clearly dictates otherwise.

Reference numerals assigned to operations are used only for convenience of description rather than describing an order of the operations and thus these operations may be performed in an order different from that described above unless the context indicates a specific order.

Hereinafter, a principle of operation of the present disclosure and embodiments will be described with reference to the accompanying drawings.

FIG. 1 is a control block diagram of a dialogue system according to an exemplary embodiment of the present disclosure.

The dialogue system 100 may include a voice recognition module 110, an intention determination module 120, an emotion determination module 130, a database 150, and a controller 140.

Figure 6:
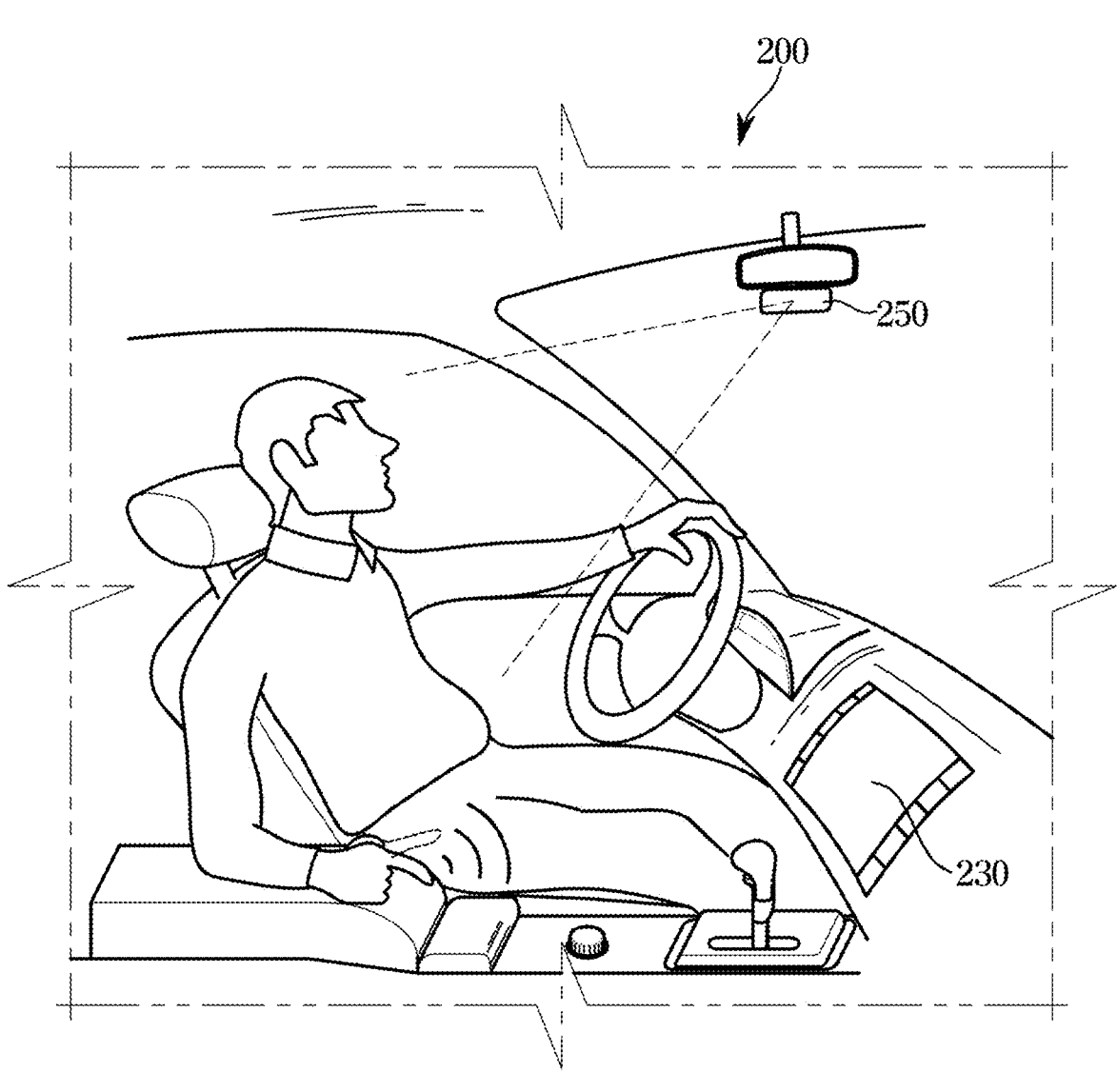
FIG. 6 is a diagram illustrating a camera that photographs a user according to an exemplary embodiment of the present disclosure.

The voice recognition module 110 may convert the utterance of a user in a vehicle 200 of FIG. 6 into text.

The user's utterance may be input through a microphone 210 provided separately in the vehicle 200 or the like, and the voice recognition module 110 may convert the input user's utterance into text.

The intention determination module 120 may identify the user's intention based on the text obtained by conversion by the voice recognition module 110.

That is, it is possible to identify whether the user's utterance is intended to ask a question, make a request, make a response, or simply express an emotion.

The emotion determination module 130 may identify the user's emotional state from the user's intention determined by the intention determination module 120.

That is, it is possible to identify the user's emotional state, i.e., an emotion that the user is currently feeling, e.g., whether the user is currently feeling tired or angry.

The database 150 may store various types of data related to analyzing a user's utterance and outputting a response thereto.

For example, the database 150 may store rules for determining whether to respond based on the user's intention and emotional state.

The controller 140 may compare data indicating the user's intention identified by the intention determination module 120 and the user's emotional state identified by the emotion determination module 130 with the rules stored in the database 150.

That is, whether the user's intention and emotional state satisfy a condition for making a response may be determined.

The controller 140 may determine whether to output a response to the user's utterance based on a result of the comparing.

The dialogue system 100 described above may be implemented by at least one memory storing a program for performing the above-described operations and at least one processor 141 for executing the stored program.

The components of the dialogue system 100 shown in FIG. 1 are classified based on operations or functions thereof and the at least one memory or the at least one processor 141 may be shared by some or all of these components. That is, the voice recognition module 110, the intention determination module 120, the emotion determination module 130, and the controller 140 may not be necessarily understood as physically separated components Furthermore, the intention determination module 120 and the emotion determination module 130 may be individually included as separate modules or only one of them may be operated.

For example, whether to respond to the user's utterance may be determined only based on the user's intention identified by the intention determination module 120.

FIG. 2 is a diagram illustrating the detection of a user's utterance and analysis of the user's intention and emotion by a dialogue system according to an exemplary embodiment of the present disclosure.

A user may give various types of utterances.

When a user says "Wow, I'm really tired today," the voice recognition module 110 may convert the present sentence into text and the intention determination module 120 may identify the user's intention based on the text.

Regarding the sentence, the intention determination module 120 may identify the user's intention to express his or her emotion and identify the emotion as "tired."

The emotion determination module 130 may identify the user's emotional state from the identified user's intention. It may be determined from the sentence that the user is feeling "tired" and a level of tiredness is "medium."

When the user says "I want to go somewhere," the voice recognition module 110 may convert the present sentence into text and the intention determination module 120 may identify the user's intention based on the text.

Regarding the sentence, the intention determination module 120 may identify the user's intention to express his or her emotion and identify that the emotion is related to "travel."

The emotion determination module 130 may identify the user's emotional state from the identified user's intention. It may be determined from the sentence that the user is feeling "neutral."

As described above, a user's intention and emotional state may be identified by analyzing his or her utterance, and the controller 140 may compare data representing the intention and emotional state with the rules stored in the database 150 and determine whether to output a response to the user's utterance based on a result of the comparing.

For example, it may be determined to output a response to the user's utterance when a level of the user's emotional state is "high."

It may be determined to output a response to the user's utterance when the level of the emotional state is "medium" and a signal related to the vehicle 200 to be described below indicates "normal."

As described above, a user's utterance may be converted into text through a voice recognition module, the text may be analyzed to identify the user's intention or emotional state, and whether to respond to the user's utterance may be strictly determined according to rules stored in a database.

The rules stored in the database may be rules related to conditions for users' intentions, emotional states, and traffic signals. The rules may be prescribed and stored in the database. For example, rules that prescribe a response to be output when a user's intention or emotional state identified from his or her utterance meets a condition for intentions or emotional states stored in the database may be stored.

Alternatively, as will be described below, whether to output a response may be determined by receiving a signal related to a vehicle by a communicator and comparing data contained in the signal with the rules stored in the database, in addition to the user's intention and emotional state.

The signal related to the vehicle is received to determine whether it is not dangerous to output a response to the user's utterance, i.e., to determine whether a current situation is a high risk situation, e.g., a situation which may distract a driver who is driving a vehicle on the highway at a high speed. This will be described in detail below.

There are cases in which a voice recognition module cannot identify a user's utterance and convert it into text in some cases. However, even in these cases, when an emotion determination module is capable of identifying the user's emotional state according to the intonation, volume, etc. of the user's utterance, whether to respond to the user's utterance may be determined based on the intonation, volume, etc. of the user's utterance.

Figure 3:
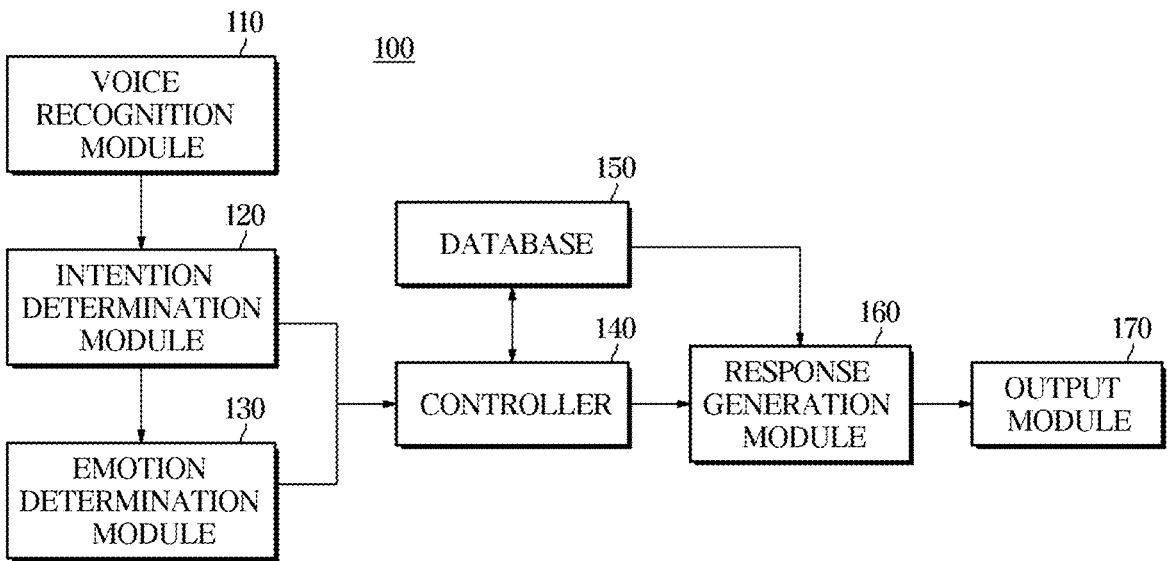
FIG. 3 is a control block diagram of a dialogue system according to an exemplary embodiment of the present disclosure.

FIG. 3 is a control block diagram of a dialogue system according to an exemplary embodiment of the present disclosure.

The dialogue system 100 may further include a response generation module 160 and an output module 170.

The response generation module 160 may generate a response to a user's utterance, and the output module 170 may convert the response generated by the response generation module 160 into the form of voice.

When the controller 140 compares data indicating the user's intention and emotional state with the rules stored in the database 150 and determines to respond to the user's utterance, the response generation module 160 may generate a response to the user's utterance, and the output module 170 may convert the response generated by the response generation module 160 into the form of voice and output the voice.

Figure 4:
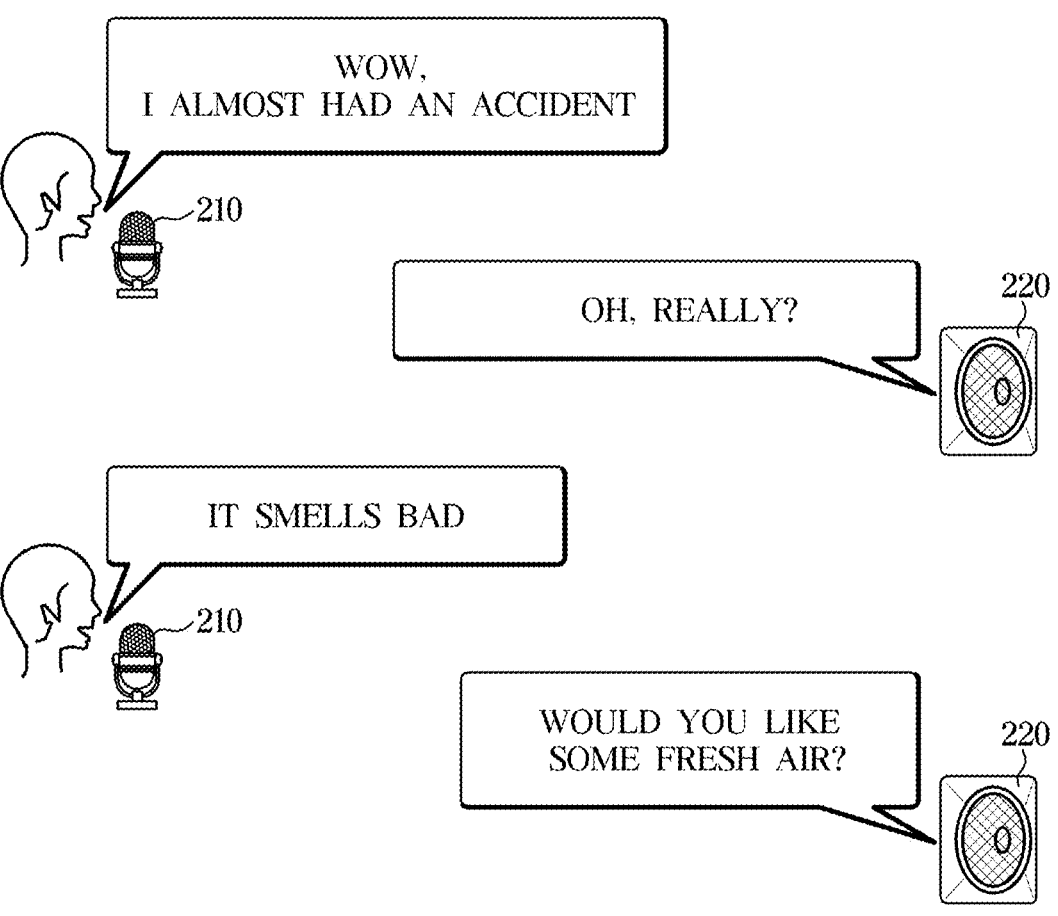
FIG. 4 is a diagram illustrating a response to a user's utterance by a dialogue system according to an exemplary embodiment of the present disclosure.

The voice may be output to the outside through a speaker 220 of FIG. 4.

The response generation module 160 may generate the response based on response data stored in the database 150.

The database 150 may store response data corresponding to users' utterances.

The response generation module 160 may generate the response based on the response data stored in the database 150.

FIG. 4 is a diagram illustrating a response to a user's utterance by a dialogue system according to an exemplary embodiment of the present disclosure.

When a user says ""Wow, I almost had an accident," the user's utterance may be converted into text and the user's intention and emotional state may be determined based on the text.

When it is determined to respond to the user's utterance based on the user's intention and emotional state, the response generation module 160 may generate a response "Oh, really?" based on response data stored in the database 150, and the response may be converted into the form of voice by the output module 170 and output through the speaker 220.

When the user says "It smells bad," the user's utterance may be converted into text and the user's intention and emotional state may be determined based on the text.

When it is determined to respond to the user's utterance based on the user's intention and emotional state, the response generation module 160 may generate a response "Would you like some fresh air?" based on the response data stored in the database 150, and the response may be converted into the form of voice by the output module 170 and output through the speaker 220.

Figure 5A:
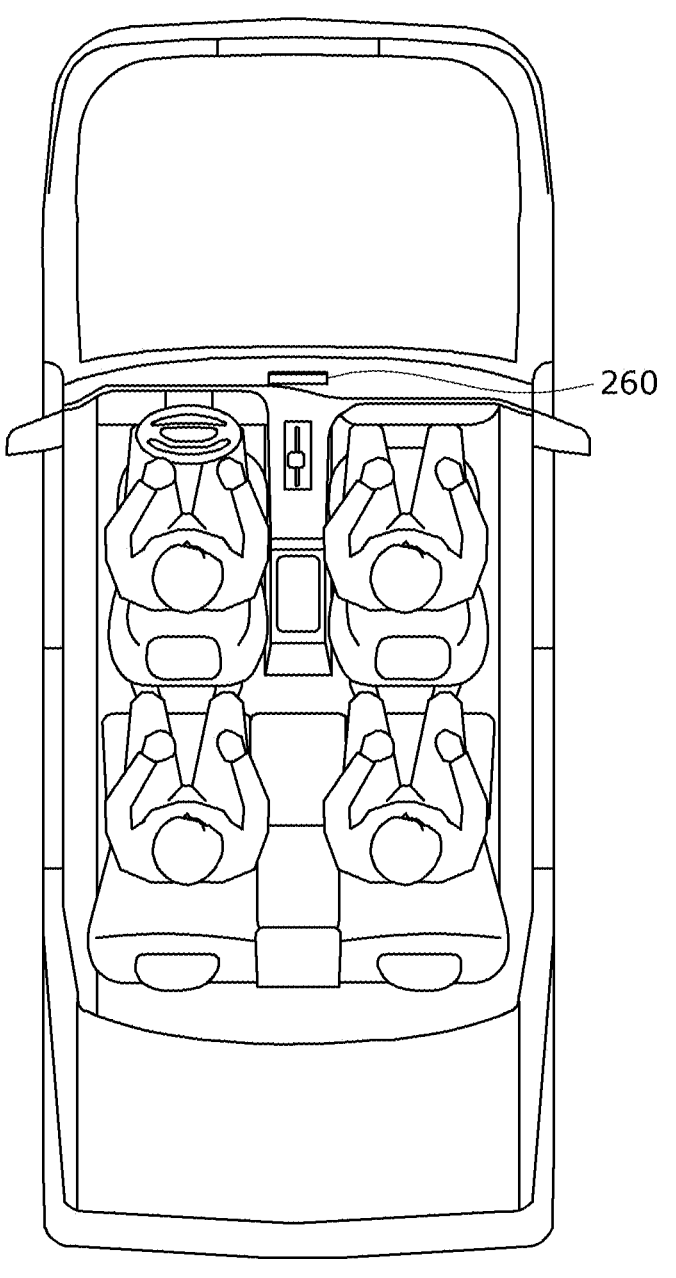
FIG. 5A and FIG. 5B are diagrams illustrating the number of passengers in a vehicle.
Figure 5B:
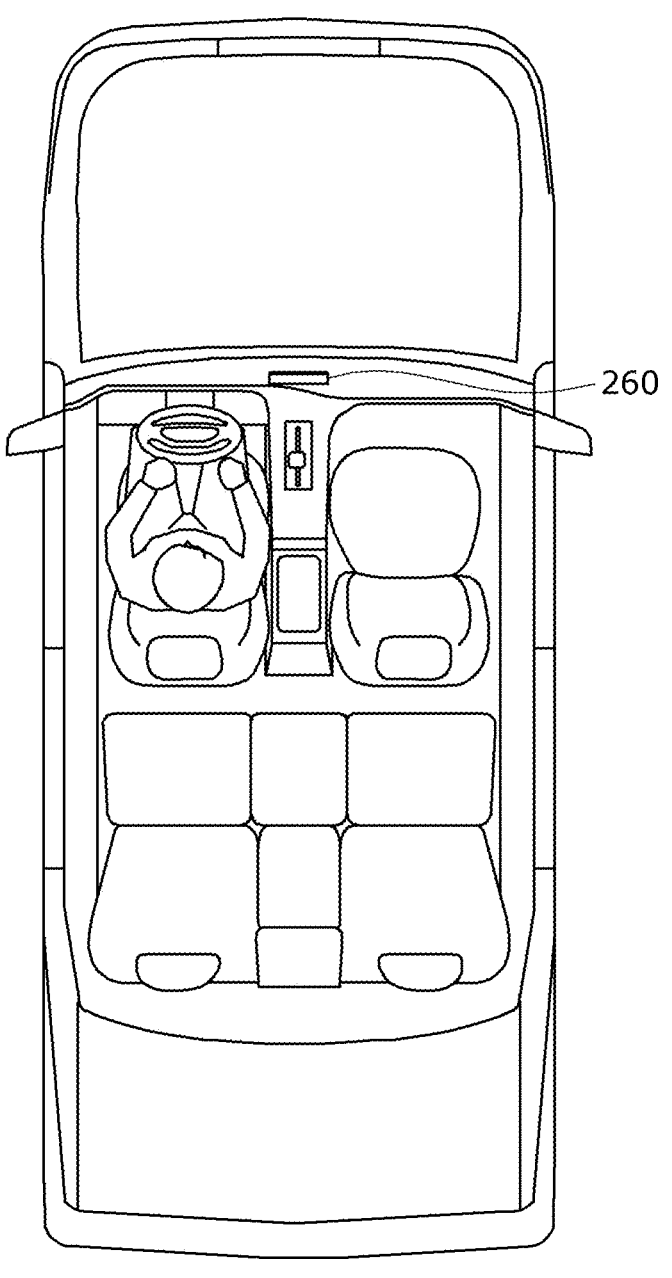

FIG. 5A and FIG. 5B are diagrams illustrating the number of passengers in a vehicle.

When a plurality of passengers are in the vehicle 200, it is likely that the plurality of passengers have a conversation with each other and thus the dialogue system 100 may not need to respond to utterances.

Thus, at least one sensor 260 may be provided in the vehicle 200 to detect the number of users in the vehicle 200 and increase the efficiency of the dialogue system 100.

When one user is detected by the at least one sensor 260 provided in the vehicle 200 to detect the number of users, it is likely that the user is talking to himself or herself and thus the microphone 210 may be always be activated to detect the user's utterance and provide an appropriate response.

In FIG. 5A, there are four users in the vehicle 200 and thus the number of users in the vehicle 200 is identified to be four based on a result of detection by the at least one sensor 260.

On the other hand, in FIG. 5B, only one user who is a driver is in the vehicle 200 and thus the controller 140 may generate a control signal to activate the microphone 210 at all times based on a result of detection by the at least one sensor 260, which indicates that there is only one user in the vehicle 200.

FIG. 6 is a diagram illustrating a camera that photographs a user according to an exemplary embodiment of the present disclosure.

When determining a user's intention, not only the user's utterance but also the user's gaze, mouth shape, or gesture may be considered.

Accordingly, a camera 250 may be provided in a vehicle 200 to photograph the user, and the intention determination module 120 may identify the user's intention based on an image captured by the camera 250.

The captured image may include information related to the user's gaze, mouth shape, gesture, etc.

When the intention determination module 120 identifies the user's intention based on the image captured by the camera 250, the emotion determination module 130 may identify the user's emotional state based on the identified user's intention.

The user's intention and emotional state may be identified more accurately by taking into account not only the user's utterance but also the image captured by the camera 250.

FIG. 7 is a control block diagram of a dialogue system and a vehicle according to an exemplary embodiment of the present disclosure.

The dialogue system 100 may further include a communicator 180 that receives a signal related to the vehicle 200 from the vehicle 200.

The controller 140 may determine whether to respond to a user's utterance based on a signal related to the vehicle 200 received by the communicator 180.

The signal related to the vehicle 200 may include a speed of the vehicle 200, an angle of a steering wheel of the vehicle 200, navigation information, etc.

Whether to respond to the user's utterance may be determined by identifying a level of distraction on the user while driving, a level of difficulty of driving at a current point in time, etc., based on the signal related to the vehicle 200.

For example, when the speed of the vehicle 200 is very high, a driving risk is high when a driver is distracted while driving at a high speed and the user's utterance may not be responded to.

The controller 140 may store, in the database 150, data related to the user's intention identified by the intention determination module 120, data about the user's emotional state identified by the emotion determination module 130, and data about the signal related to the vehicle 200 received by the communicator 180.

By storing and re-learning such data, the performance of determining whether to respond may be further improved.

Figure 8A:
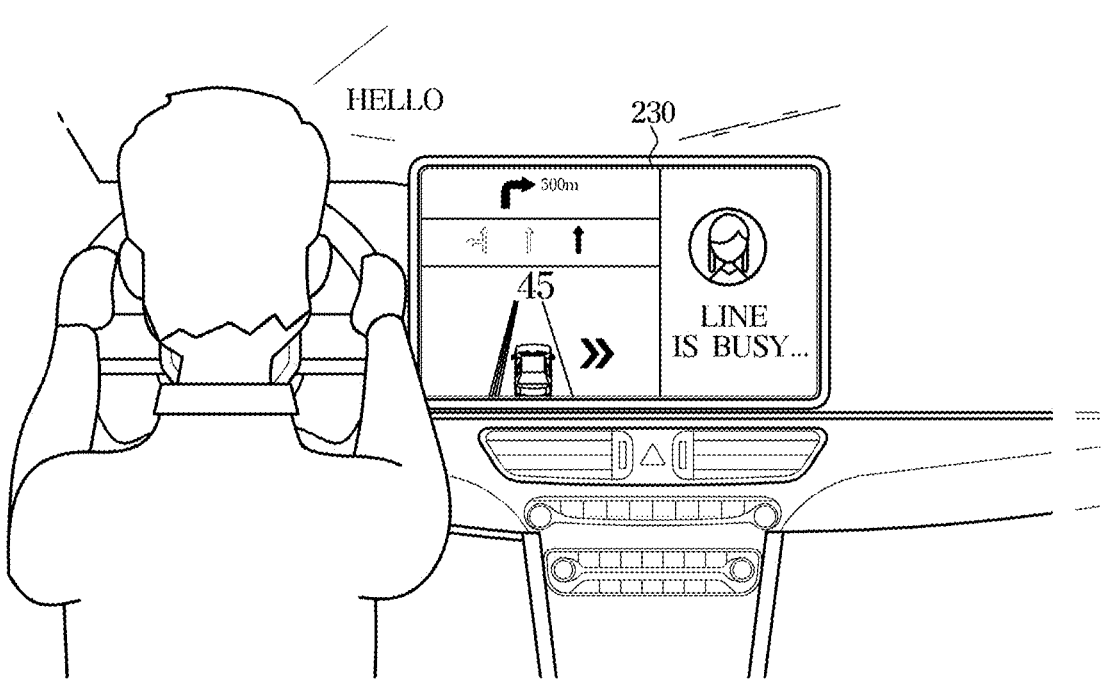
FIG. 8A and FIG. 8B are diagrams illustrating a user who is talking on the phone or is singing a song according to an exemplary embodiment of the present disclosure.
Figure 8B:
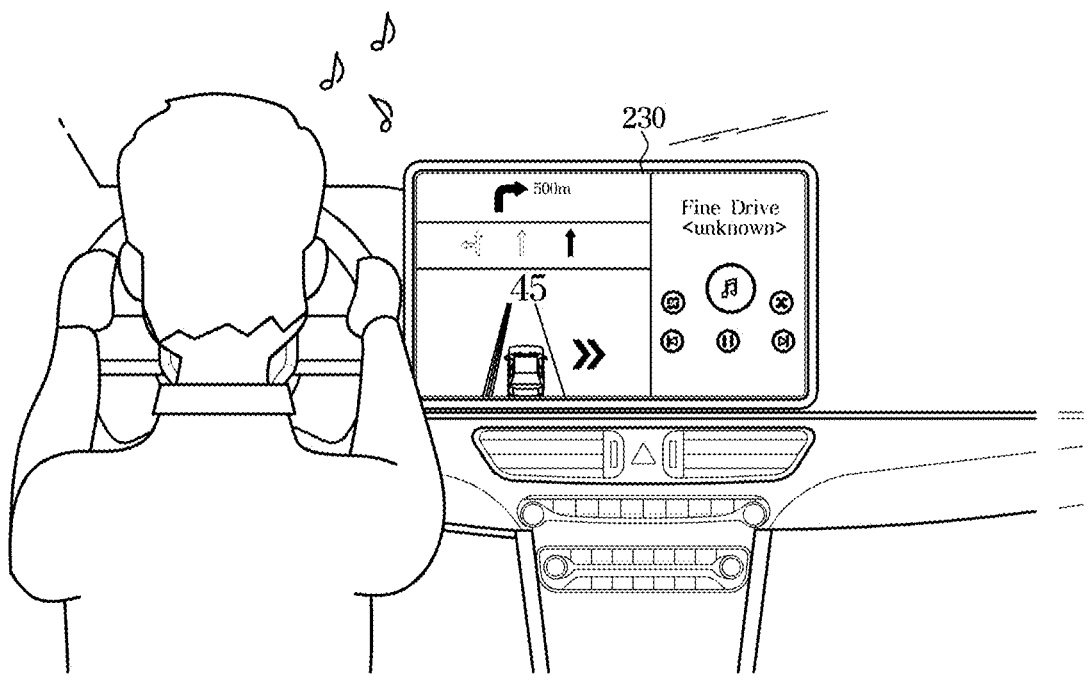

FIG. 8A and FIG. 8B are diagrams illustrating a user who is talking on the phone or is singing a song according to an exemplary embodiment of the present disclosure.

When it is determined that text obtained by a conversion by the voice recognition module 110 is related to the user's singing or talking, the controller 140 may determine not to respond to a detected utterance.

When the user is talking on the phone as shown in FIG. 8A or is singing a song as shown in FIG. 8B, there is no need to respond to the user's utterance, and thus, the controller 140 may analyze the user's utterance and determine not to respond to the user's utterance when it is determined that the user's utterance is related to singing a song or talking on the phone.

Figure 9:
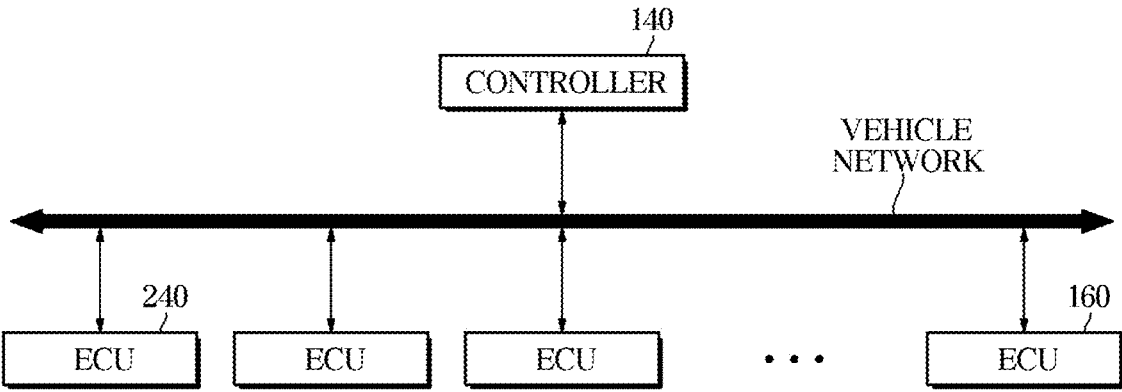
FIG. 9 is a diagram illustrating that a controller generates a control signal to control an electronic control units (ECU) according to an exemplary embodiment of the present disclosure.

FIG. 9 is a diagram illustrating that a controller generates a control signal to control an electronic control unit (ECU) according to an exemplary embodiment of the present disclosure.

The controller 140 may generate a control signal for driving a plurality of ECUs 240 included in the vehicle 200 to perform a function corresponding to a user's utterance.

The user's utterance may be simply for chatting but also may be intended for using a certain function of the vehicle 200.

For example, as shown in FIG. 4, when the user says "It smells bad" and a response "Would you like some fresh air?" is output, the control signal may be generated to drive the plurality of ECUs 240 in the vehicle 200 to perform a corresponding function when the user's subsequent utterance is a positive utterance.

That is, the control signal may be generated to drive the plurality of ECUs 240 in the vehicle 200 to operate an air conditioner in the vehicle 200 or lower a window of the vehicle 200.

Figure 10:
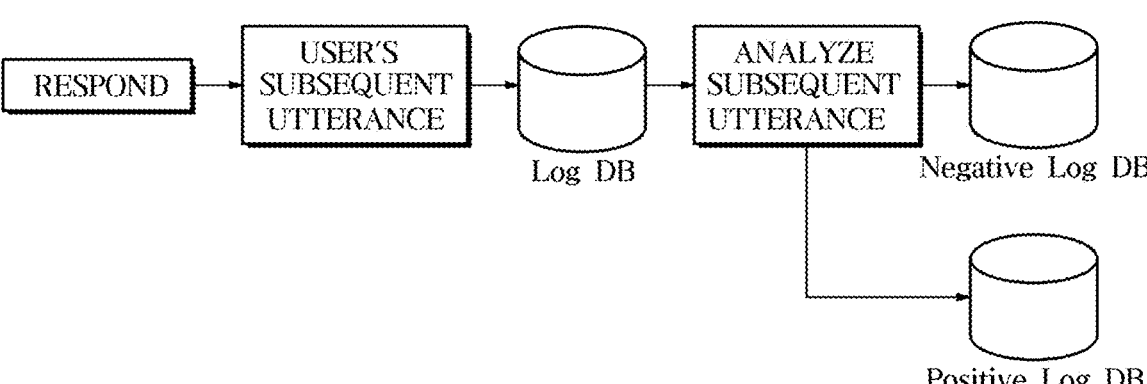
FIG. 10 is a diagram illustrating the detection of a user's subsequent utterance and storage of the detected utterance in a database in a dialogue system according to an exemplary embodiment of the present disclosure.

FIG. 10 is a diagram illustrating the detection of a user's subsequent utterance and storage of the detected utterance in a database in a dialogue system according to an exemplary embodiment of the present disclosure. FIG. 11 is a diagram illustrating the analysis of a user's subsequent utterance in a dialogue system according to an exemplary embodiment of the present disclosure.

A user may additionally make a subsequent utterance in response to a response from the dialogue system 100.

As shown in FIG. 11, when the dialogue system 100 generates and outputs a response to a user's utterance, the user may make subsequent utterance, e.g., make a negative utterance such as "Be quiet" or a positive utterance such as "I like it" or "Good."

In the instant case, the voice recognition module 110 may convert the user's subsequent utterance for the output response into text, and the controller 140 may store information related to the text converted from the subsequent utterance in the database 150.

That is, the controller 140 may analyze the user's utterance based on the converted text to determine whether the user's utterance is negative or positive.

When data is classified and labeled, a method of identifying data manually, a method of identifying data by a classifier, or a method of identifying data based on rules may be used.

In the identification of data manually, data is identified and labeled by a person (manual labeling or expert labeling). Data may be identified, labeled and learned by an ordinary person or an expert in the art.

The identification of data by the classifier may include classification using a support vector machine (SVM) model, classification using a convolutional neural network (CNN) or recurrent neural network (RNN) model, classification using a Bert model, and the like.

In classification using a pretrained language model such as the Bert model, data is classified by training a language model using a large amount of unlabeled data and performing fine-tuning using pre-classified data.

In the identification of data through rules, data is labeled according to predetermined rules.

In the present disclosure, a CNN, a RNN model classifier, or a pretrained language model may be used to classify speech data uttered by a user and labeling the speech data as positive or negative.

To label speech data as positive or negative, a binary classifier may be used and thus positive or negative speech data may be learned using pre-classified data and speech data uttered by a user may be identified and labeled as positive or negative.

In the present disclosure, labeling is performed for two cases, i.e., positive or negative, but labeling may be performed for three cases, i.e., positive, negative or neutral, in some cases.

When it is determined that the user's utterance is negative, the controller 140 may classify and store information related to the text of the user's subsequent utterance related thereto in a negative category in the database 150.

When it is determined that the user's utterance is positive, the controller 140 may classify and store information related to the text of the user's subsequent utterance related thereto in a positive category in the database 150.

The dialogue system 100 may learn data stored in the negative category and the positive category in the database. Accordingly, response performance may be improved by reducing errors in a response to a user's utterance in the future and generating a more appropriate response to the user's utterance.

A controller may be configured to determine whether to activate a microphone based on data stored in the negative category and the positive category in the database.

The determination as to whether to activate the microphone is simply determining whether to turn on or off the microphone, and the SVM model described above may be used therefor.

Figure 12:
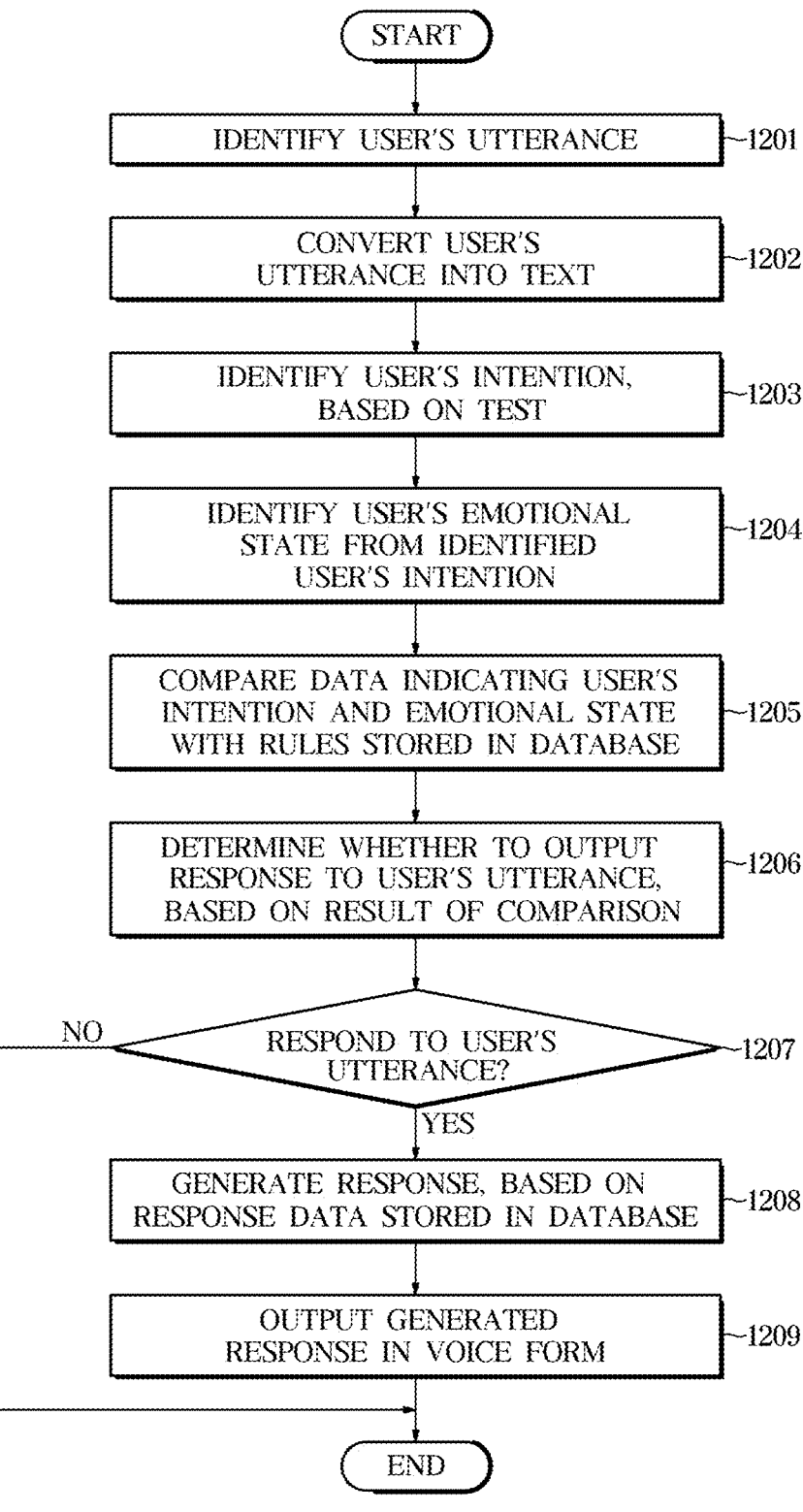
FIG. 12 is a flowchart of a method of controlling a dialogue system according to an exemplary embodiment of the present disclosure.

FIG. 12 is a flowchart of a method of controlling a dialogue system according to an exemplary embodiment of the present disclosure.

First, a user's utterance is recognized through the microphone 210 or the like (1201), and converted into text. (1202)

The user's utterance may be input through a microphone 210 provided separately in the vehicle 200 or the like, and the voice recognition module 110 may convert the input user's utterance into text.

Thereafter, the user's intention may be identified based on the text (1203), and the user's emotional state may be identified from the identified intention of the user (1204).

That is, it is possible to find out the intention of the user's utterance, such as whether the user is asking a question, making a request, responding, or simply expressing an emotion, and to identify the user's emotional state, such as whether the user is currently feeling tired or angry.

Data indicating the identified intention of the user and the user's emotional state may be compared with the rules stored in the database 150 (1205), and whether to output a response to the user's utterance may be determined based on a result of the comparison (1206).

When it is determined to respond to the user's utterance (example of 1207), a response may be generated based on the response data stored in the database 150 (1208), and the generated response may be output in a form of voice (1209)

According to a dialogue system and a control method thereof according to an aspect of the present disclosure, a user's utterance may be recognized without a certain trigger and the user's intention and emotion may be analyzed to provide a response thereto.

Furthermore, feedback may be collected from the user using a database and performance of determining whether to respond to the user may be increased to allow a natural conversation to be performed at a timing that the user desires.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A dialogue system comprising:
a database;
a voice recognition module configured to convert an utterance of a user in a vehicle into text;
an intention determination module configured to identify intention of the user based on the text;
a controller configured to compare data indicating the identified intention of the user with rules stored in the database and determine whether to output a voice response to the utterance of the user based on a result of the comparing; and
a speaker configured to output the voice response; and
a communicator configured to receive a signal related to the vehicle, and
wherein the controller is configured to determine a degree of driver's attention distraction based on the signal related to the vehicle received by the communicator, and to determine not to output the voice response when the determined degree of driver's attention distraction indicates a high-risk driving situation.

2. The dialogue system of claim 1, further including an emotion determination module configured to identify an emotional state of the user from the intention of the user, and
wherein the controller is further configured to:
compare the data indicating the identified intention of the user and the emotional state of the user with the rules stored in the database; and
determine whether to output the voice response to the utterance of the user based on a result of the comparing of the data indicating the identified intention of the user and the emotional state of the user with the rules stored in the database.

3. The dialogue system of claim 2, further including:
a response generation module configured to generate a response to the utterance of the user; and
an output module configured to convert the generated response into a form of voice,
wherein when the controller determines to respond to the utterance of the user, the response generation module is configured to generate the response to the utterance of the user, and the output module is configured to convert the generated response into the form of voice and output the voice response.

4. The dialogue system of claim 3, wherein the response generation module is configured to generate the response based on response data stored in the database.

5. The dialogue system of claim 3,
wherein the voice recognition module is configured to convert the user's subsequent utterance to the output response into text, and
wherein the controller is configured to store information related to the text of the subsequent utterance in the database.

6. The dialogue system of claim 5,
wherein the controller is configured to store the information related to the text of the subsequent utterance in a negative category of the database when the controller concludes that the user's subsequent utterance is negative as a result of analyzing the text of the user's subsequent utterance, and to store the information related to the text of the subsequent utterance in a positive category of the database when the controller concludes that the user's subsequent utterance is positive as the result of analyzing the text of the user's subsequent utterance.

7. The dialogue system of claim 6, wherein the controller is configured to learn data stored in the negative category and the positive category in the database.

8. The dialogue system of claim 2,
wherein the intention determination module is configured to identify the intention of the user based on an image captured by a camera, and
wherein the emotion determination module is configured to identify the emotional state of the user from the intention of the user.

9. The dialogue system of claim 1, wherein, when one user is detected by at least one sensor configured to detect a number of users, the controller is configured to activate a microphone all the time to detect the utterance of the user.

10. The dialogue system of claim 1, wherein the controller is configured to store, in the database, the data related to the intention of the user identified by the intention determination module, data about the emotional state of the user identified by the emotion determination module, and data about the signal related to the vehicle received by the communicator.

11. The dialogue system of claim 1, wherein, when the controller concludes that the text obtained by conversion by the voice recognition module is related to the user's singing a song or talking on a phone, the controller is configured to determine not to respond to the utterance of the user.

12. The dialogue system of claim 1, wherein the controller is configured to generate a control signal for driving a plurality of electronic control units (ECUs) included in the vehicle to perform a function corresponding to the utterance of the user.

13. A method of controlling a dialogue system including a processor and a memory, the method comprising:
converting an utterance of a user in a vehicle into text;
identifying intention of the user based on the text;
comparing, by a controller, data indicating the identified intention of the user with rules stored in a database;
determining, by the controller, whether to output a voice response to the utterance of the user based on a result of the comparing; and
outputting the voice response through a speaker,
wherein the method further includes: receiving a signal related to the vehicle,
wherein the determining of whether to output the voice response to the utterance of the user includes:
determining a degree of driver's attention distraction based on the received signal related to the vehicle, and
determining not to output the voice response when the determined degree of driver's attention distraction indicates a high-risk driving situation.

14. The method of claim 13, further including:
identifying an emotional state of the user from the identified intention of the user,
wherein the determining of whether to output the voice response to the utterance of the user includes:
comparing the data indicating the identified intention of the user and the emotional state of the user with the rules stored in the database; and
determining whether to output the voice response to the utterance of the user based on a result of the comparing of the data indicating the identified intention of the user and the emotional state of the user with the rules stored in the database.

15. The method of claim 13, further including, when the controller determines to respond to the utterance of the user, generating a response to the utterance of the user, converting the generated response into a form of voice, and outputting the voice response.

16. The method of claim 15, wherein the generating of the response to the utterance of the user includes generating the response based on response data stored in the database.

17. The method of claim 15, further including:

converting the user's subsequent utterance to the output response into text; and storing information related to the text of the subsequent utterance in the database.

18. The method of claim 17, further including:

analyzing the text of the user's subsequent utterance;

storing the information related to the text of the subsequent utterance in a negative category in the database when the controller concludes that the analyzed text of the user's subsequent utterance is negative; and storing the information related to the text of the subsequent utterance in a positive category in the database when the controller concludes that the analyzed text of the user's subsequent utterance is positive.

19. The method of claim 13, further including:

when one user is detected by at least one sensor configured to detect a number of users, activating a microphone all the time to detect the utterance of the user.

20. The method of claim 13, wherein the identifying of the intention of the user includes identifying intention of the user based on an image captured by a camera, and wherein the identifying of the emotional state of the user includes identifying the emotional state of the user from the identified intention of the user.

21. The method of claim 13, further including:

storing, in the database, the data related to the intention of the user, data related to the identified emotional state of the user, and data of the received signal related to the vehicle.

22. The method of claim 13, wherein the determining of whether to output the response to the utterance of the user includes determining not to respond to the utterance of the user when the controller concludes that the text is related to the user's singing a song or talking on a phone.

23. The method of claim 13, further including:

generating a control signal for driving a plurality of electronic control units (ECUs) included in the vehicle to perform a function corresponding to the utterance of the user.

24. A non-transitory computer-readable medium storing computer-executable instructions when executed by a processor of the controller, cause the processor to perform steps of the method of claim 13.

* * * * *